US010387818B2

(12) United States Patent
Reville et al.

(10) Patent No.: US 10,387,818 B2
(45) Date of Patent: Aug. 20, 2019

(54) VISUALIZATION INTERFACE FOR DETERMINING COMPANY RISK

(71) Applicant: Praedicat, Inc., Culver City, CA (US)

(72) Inventors: Robert Thomas Reville, Los Angeles, CA (US); Joseph Prindle, Santa Monica, CA (US); Lauren Caston, Venice, CA (US); Adam Grossman, Los Angeles, CA (US)

(73) Assignee: Praedicat, Inc., Los Angeles, CA (US)

( * ) Notice: Subject to any disclaimer, the term of this patent is extended or adjusted under 35 U.S.C. 154(b) by 436 days.

(21) Appl. No.: 13/924,316

(22) Filed: Jun. 21, 2013

(65) Prior Publication Data

US 2014/0375667 A1   Dec. 25, 2014

(51) Int. Cl.
*G06Q 10/06* (2012.01)
*G06T 11/20* (2006.01)
*G06T 11/00* (2006.01)

(52) U.S. Cl.
CPC ........ *G06Q 10/0635* (2013.01); *G06T 11/001* (2013.01); *G06T 11/206* (2013.01)

(58) Field of Classification Search
None
See application file for complete search history.

(56) References Cited

U.S. PATENT DOCUMENTS

| 2005/0154618 | A1* | 7/2005 | Kita | G06Q 40/08 |
| | | | | 705/4 |
| 2012/0253891 | A1* | 10/2012 | Hayes | G06Q 10/06 |
| | | | | 705/7.39 |
| 2014/0278728 | A1* | 9/2014 | Hollenbach | G06Q 10/0635 |
| | | | | 705/7.28 |

* cited by examiner

*Primary Examiner* — Aaron M Richer
(74) *Attorney, Agent, or Firm* — Stephen C. Jones

(57) ABSTRACT

Examples of the disclosure are directed to generating visualizations that illustrate various measures of risk associated with a litagion® agent in the context of entire industries or specific to a single party that produces or uses the litagion® agent. A Quindrex™ visualization can illustrate catastrophic risk presented by a risk agent, such as a litagion® agent. For example, the risk agent may be a chemical such as bisphenol A (BPA) or benzene. The visualization can include a plurality of portions, each corresponding to a metric of catastrophic risk associated with the risk agent visualized. A dartboard visualization can illustrate catastrophic risk presented by risk agents produced or used by a party, such as a company. The visualization can include a plurality of portions, such as wedges in a dartboard, each corresponding to a risk agent produced or used by the party.

16 Claims, 7 Drawing Sheets

US 10,387,818 B2

VISUALIZATION INTERFACE FOR DETERMINING COMPANY RISK

FIELD OF THE DISCLOSURE

This relates generally to an interface for visualizing catastrophic risk data.

SUMMARY

Examples of the disclosure are directed to generating visualizations that illustrate various measures of risk associated with a litagion® agent in the context of entire industries or specific to a single party that produces or uses the litagion® agent.

A Quindrex™ visualization can illustrate catastrophic risk presented by a risk agent, such as a litagion® agent. For example, the risk agent may be a chemical such as bisphenol A (BPA) or benzene. The visualization can include a plurality of portions, each corresponding to a metric of catastrophic risk associated with the risk agent visualized.

A dartboard visualization can illustrate catastrophic risk presented by risk agents produced or used by a party, such as a company. The visualization can include a plurality of portions, such as wedges in a dartboard, each corresponding to a risk agent produced or used by the party.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Examples of the disclosure are directed toward helping insurance companies writing commercial liability insurance assess their exposure to the risk of mass litigation by generating visualizations of the risk. A mass litigation episode is the occurrence of a large number of lawsuits alleging liability for harm that have a correlated or common fact basis. At the center of a mass litigation episode is a litagion® agent.

Throughout various examples, a litagion® agent can be a material, substance, product, service, or practice that is a common denominator in a mass litigation episode. The common denominator may be the element of a mass litigation episode that creates correlation across losses in an insurer's underwriting portfolio. Asbestos is the canonical example of a litagion® agent. The association of asbestos with mesothelioma, asbestosis, and other health conditions has led to litigation against a large number of insured businesses that spans a wide variety of industries. Applying limits on insurance policies is insufficient to protect insurers from losses that encompass a significant portion of their underwriting portfolio. However, a litagion® agent need not be a material or substance. A business service or practice might also be a litagion® agent. For example, sub-prime lending practices, options-backdating, "laddering" in Initial Public Offerings, and/or the like are all common denominators of mass litigation and therefore litagion® agents. litagion® agents are also discussed in application Ser. No. 13/264,734, all of which is hereby incorporated by reference.

Examples of the disclosure are directed to generating visualizations that illustrate various measures of risk associated with a litagion® agent in the context of entire industries or specific to a single party that produces or uses the litagion® agent.

Although examples of the disclosure are discussed with reference to risk of mass litigation and litagion® agents, the methods disclosed are not so limited and may apply to visualizing catastrophic risk and any risk in general.

Figure 1A:
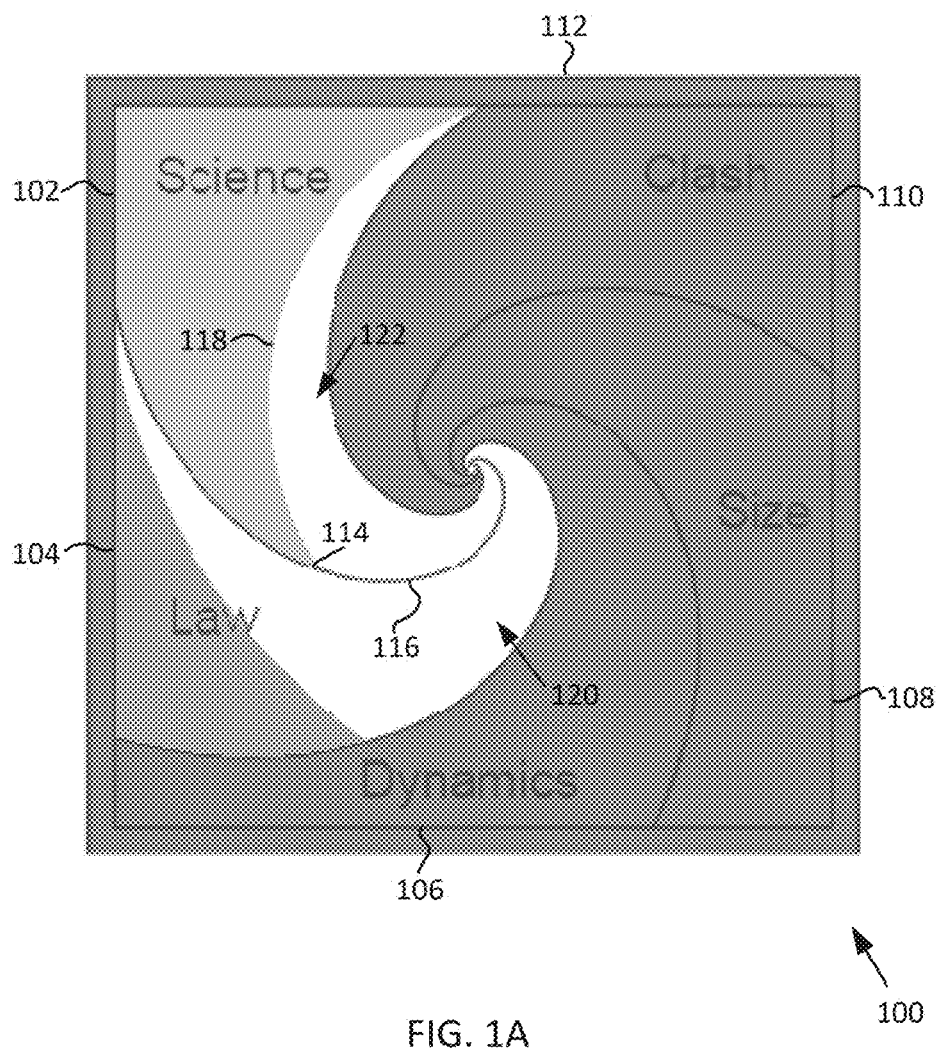
FIG. 1A illustrates an exemplary Quindrex™ visualization of catastrophic risk presented by a risk agent according to examples of the disclosure.

FIG. 1A illustrates an exemplary Quindrex™ visualization 100 of catastrophic risk presented by a risk agent, such as a litagion® agent. For example, the risk agent may be a chemical such as bisphenol A (BPA) or benzene. The visualization can include a plurality of portions 102, 104, 106, 108, and 110, each corresponding to a metric of catastrophic risk associated with the risk agent visualized.

The size and/or the color of the portion may be determined based on a value of the corresponding metric. For example, a first portion may be colored red based on its corresponding value being higher than a first threshold, a second portion may be colored yellow based on its corresponding value being lower than the first threshold but higher than a second threshold, and a third portion may be colored green based on its corresponding value being lower than the second threshold. In some examples, the color of a portion may be determined by mapping a corresponding metric value to a color gradient. In one example, a linear color gradient may be used to map values on a scale of 0 to 1 to colors. The value 0 can map to green, 0.5 can map to yellow, and 1 can map to red. Intervening values can map to transitional colors between the three target colors in the gradient.

Similarly, the size of a portion may be determined by comparing a corresponding value to one or more thresholds. In some examples, the shape of the portion may be drawn based on the corresponding value such that the size of the portion is based on the value. One such example is described in more detail below with reference to both FIGS. 1A, 1B, and 2.

FIG. 1A illustrates a Quindrex™ visualization having five portions. A first portion 102 may correspond to a science metric. The science metric may be a measure of general causation risk of the litagion® agent, i.e., the likelihood that a court of law will find that the weight of scientific evidence supports the hypothesis that exposure to the litagion® agent could, in principle, cause a given bodily injury.

A second portion 104 may correspond to a law metric. The law metric may be a measure of specific causation risk of the litagion® agent, i.e., the likelihood that a court of law will find that a particular plaintiff's bodily injury was caused by a particular defendant's actions associated with a litagion® agent. In FIG. 1A, the first portion 102 is larger than the second portion 104, illustrating that the general causation risk is greater than the specific causation risk. Each risk metric may be normalized on a scale of 0 to 1, for example, so that the metrics can be compared. In some examples, the first portion 102 may be a different color than the second portion 104 to also illustrate that the general causation risk is greater than the specific causation risk. For example, the first portion 102 may be colored yellow and the second portion 104 may be colored green. Both the science metric and the law metric can be measures of the severity of the risk associated with a litagion® agent.

A third portion 106 may correspond to a dynamics metric. The dynamics metric may be a measure of the speed of development of new scientific information regarding harms of the litagion® agent. This can illustrate the time dimension of catastrophic risk of a litagion® agent. For example, if many new scientific articles have been recently released regarding the harms of an agent, the dynamics metric may be higher than if relatively few scientific articles have been recently released.

A fourth portion 108 may correspond to a size metric. The size metric may be a measure of a number of potential plaintiffs in a mass litigation involving the litagion® agent. The size metric may also be a measure of a number of potential claims that may arise in a mass litigation involving the litagion® agent.

A fifth portion 110 may correspond to a clash metric. The clash metric may be a measure of correlation in catastrophic risk. For example, the clash metric may be a measure of a number of industries that may be exposed to mass litigation involving the litagion® agent. Accordingly, this metric can indicate whether a litagion® agent would present significant risk to even a diversified underwriting portfolio.

FIG. 1A illustrates the third 106, fourth 108, and fifth 110 portions each having a maximum size. This can indicate that the dynamics, size, and clash metrics have each exceeded significance thresholds. Similarly, each portion may be colored red to indicate that the corresponding metric value has exceeded a significance threshold. If the portion does not have the maximum size, as with portions 102 and 104, a geometric algorithm may be used to draw an edge of the portion. For example, location 114 may be selected for the first portion 102 based on the corresponding metric value, and the edge 118 may be drawn with the location 114 as an endpoint.

The Quindrex™ visualization 100 may further include a border 112. The border 112 may be colored based on a weighted sum of the values associated with each portion of the Quindrex™ visualization. The color of the border 112 can thus indicate an overall risk associated with the litagion® agent, taking into account the science, legal, dynamics, size, and clash metrics of the Quindrex™ visualization. In some examples, the border 112 may be colored based on some other method besides a weighted sum that takes into account one or more risk metrics to indicate an overall risk.

Figure 1B:
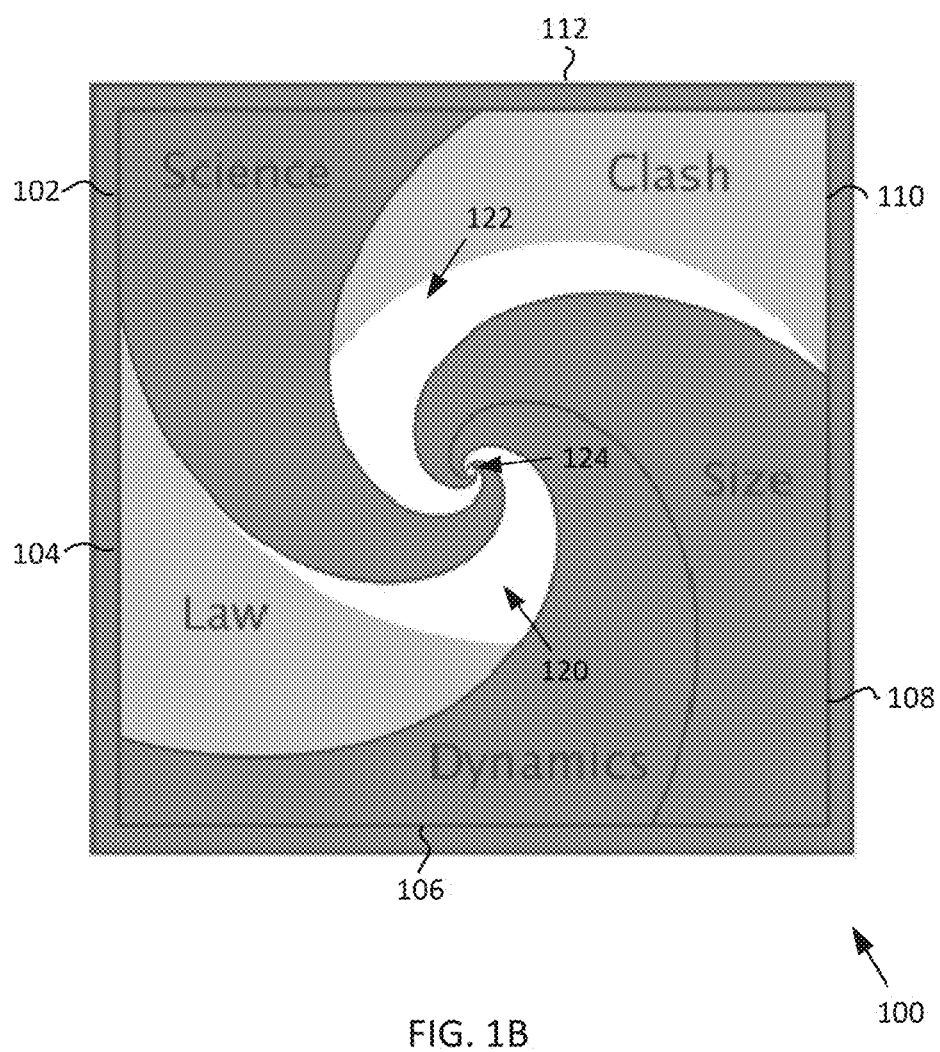
FIG. 1B illustrates another exemplary Quindrex™ visualization of catastrophic risk presented by a risk agent according to examples of the disclosure.

In some examples, the Quindrex™ visualization 100 may further include a plurality of blank spaces 120 and 122, each corresponding to one of the plurality of portions, as illustrated in FIGS. 1A and 1B. For example, blank space 120 corresponds to portion 104 and blank space 122 corresponds to portion 102. The size of a blank space may inversely correspond to the size of the corresponding portion, and thus to the value of the risk metric associated with the portion. In some examples, portions that have a maximum size, such as portions 106, 108, and 110 in FIG. 1A and portions 102, 106, and 108 in FIG. 1B, may have no corresponding blank space. Although FIGS. 1A and 1B illustrate blank spaces colored white, examples of the disclosure are not so limited, and a blank space may be colored in any way so long as it is distinguishable from its corresponding portion.

Additionally, as illustrated in FIG. 1A, the plurality of blank spaces may be contiguous (i.e., sharing a common border or touching). For example, blank spaces 120 and 122 in FIG. 1A share a common border 116. Similarly, blank spaces 120 and 122 in FIG. 1B touch at the center 124. Further, the plurality of portions 102, 104, 106, 108, and 110 may be adjacent to each other such that they surround and enclose the plurality of blank spaces, as illustrated in FIGS. 1A and 1B. This effect can emphasize the interdependence of risk—if the contiguous plurality of blank spaces dominates the visualization, then the overall risk may be low, regardless of whether it is one risk metric or another that drives the blank space.

Additionally, FIG. 1A illustrates the portions in a swirl or vortex configuration, emphasizing the chaotic and complex nature of catastrophic risk. Although FIG. 1A illustrates a visualization having five portions, examples of the disclosure are not so limited and may have any number of portions depending on the metrics used to visualize the catastrophic risk.

Figure 2:
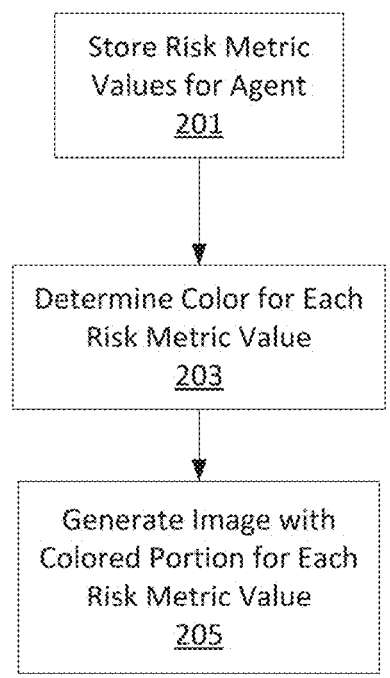
FIG. 2 illustrates an exemplary method of generating a visualization of a plurality of catastrophic risk metrics associated with a risk agent according to examples of the disclosure.

FIG. 2 illustrates an exemplary method of generating a visualization of a plurality of catastrophic risk metrics associated with a risk agent, such as a litagion® agent. Risk metric values may be stored for the risk agent on a computer readable storage medium such as a memory card, a hard disk drive, or a solid state drive, among other possibilities (201). As discussed above, risk metrics may include severity metrics, such as science and law metrics, a dynamics metric, a size metric, and/or a correlation metric, among other possibilities. In some examples, risk metric values may be obtained from a database associating the values with a plurality of risk agents.

A color may be determined for each risk metric value associated with the risk agent (203). As discussed above, each value for a given metric may be compared to one or more thresholds for a given metric to determine a color for the value. In some examples, the value may be mapped to a color gradient to determine a color for the value.

An image may be generated with a colored portion for each risk metric value (205). FIG. 1A illustrates an example of such an image. In some examples, the image may be generated as an image data structure that can be displayed on a display and/or stored on a computer readable storage medium. An image data structure can include a bitmap file, for example, or any other digital representation of an image stored on a computer readable storage medium, including compressed digital representations such as those stored in Joint Photographic Experts Group (JPEG), Graphics Interchange Format (GIF), and/or Portable Network Graphics (PNG) files, among other possibilities.

As discussed above, the size of each portion may be based on a risk metric value corresponding to the portion. For example, generating the first portion 102, illustrated in FIG. 1A, may include selecting a location 114 based on the risk metric value corresponding to the first portion 102. For example, if the risk metric value is given on a scale from 0 to 1, then the value can be used to select a location 114 on the dividing line 116. The location on the dividing line may be selected such that the proportion of the line on one side of the location is equal to the risk metric value. For example, if the risk metric value is 0.6, then the location 114 on the dividing line 116 may be selected such that 0.6 of the dividing line 116 lies on one side of the location 114. Once the location is selected, a curve 118 may be generated where the curve forms an edge of the portion 102. The location 114 is selected and the curve 118 is generated such that the size of the portion 102 is thereby based on the corresponding risk metric value. In some examples, the curve may be generated by a geometric algorithm in a swirl or vortex configuration.

In some examples, a user interface may be displayed including the visualization, and user input may be accepted on a portion allowing a user to access further information related to the risk metric value associated with the portion. For example, information related to a risk metric value may be displayed in response to user input on a portion corresponding to the risk metric value.

In some examples, variations in risk metric values may be stored over time, and a visualization may be generated for each set of risk metric values. Then, an animation may be generated with each generated visualization as a keyframe, to illustrate the changing risk metric values over time.

Figure 3:
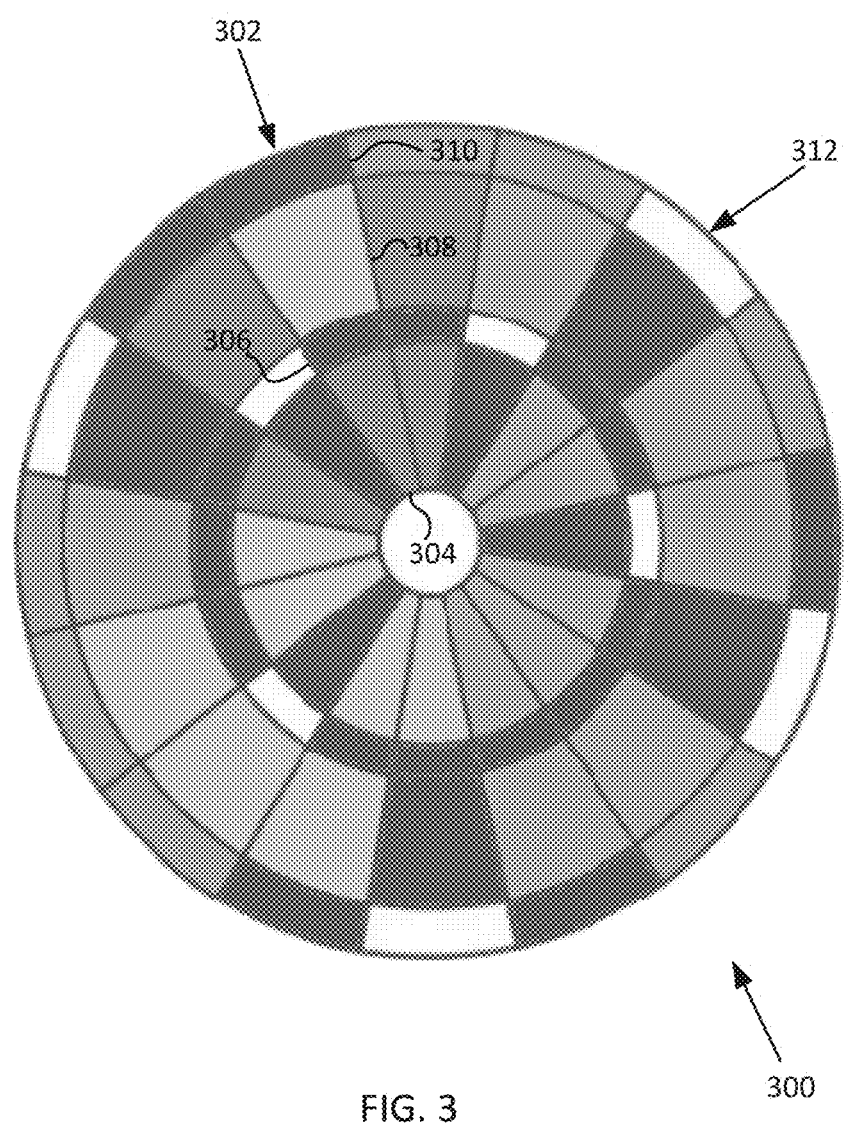
FIG. 3 illustrates an exemplary dartboard visualization of catastrophic risk presented by risk agents produced or used by a party according to examples of the disclosure.

FIG. 3 illustrates an exemplary dartboard visualization 300 of catastrophic risk presented by risk agents produced or used by a party, such as a company, or by a class of parties, such as an industry class comprising one or more companies. The visualization can include a plurality of portions, each corresponding to a risk agent produced or used by the party. For example, wedge 302 may correspond to bisphenol A and wedge 312 may correspond to styrene.

FIG. 3 illustrates each portion of the visualization 300 as a wedge of a circle. Additionally, FIG. 3 illustrates each wedge having four tiers. Wedge 302 includes inner tier 304, middle tier 306, outer tier 308, and border tier 310. Each tier of a wedge may be associated with information of the corresponding risk agent with respect to the party.

For example, the inner tier 304 may be colored based on upstream information associated with the corresponding risk agent with respect to the party, and the outer tier 308 may be colored based on downstream information associated with the corresponding risk agent with respect to the party. Specifically, upstream information may indicate whether the party is an upstream producer of the risk agent, and downstream information may indicate whether the party is a downstream user of the risk agent. In some examples, the inner tier of a wedge may be colored black unless the party produces the risk agent (i.e., upstream production), and the outer tier of the wedge may be colored black unless the party incorporates the risk agent in a product or activity (i.e., downstream usage). In this way, the colors of the inner and outer tiers can convey a sense of directionality for each risk agent associated with a party.

If the party is an upstream producer of the risk agent, then the inner tier may be colored based on an overall risk associated with the risk agent, and the coloring may be determined based on the overall risk according to methods disclosed above with respect to FIGS. 1A, 1B, and 2. If the party is a downstream user of the risk agent (e.g., in a product or activity), then the outer tier may be colored based on a risk associated with the particular usage of the risk agent, and the coloring may again be determined based on the risk according to methods disclosed above with respect to FIGS. 1A, 1B, and 2. For example, if a party is an upstream producer of bisphenol A and the overall risk value is higher than a first threshold, then the inner tier of a wedge corresponding to bisphenol A may be colored red. If the party is also a downstream user of bisphenol A in a certain product, but the risk presented by usage of bisphenol A in the certain product has a risk value lower than the first threshold and higher than a second threshold, then the outer tier of the wedge associated with bisphenol A may be colored yellow, for example.

Although FIG. 3 illustrates an inner tier 304 corresponding to upstream information and an outer tier 308 corresponding to downstream information, some examples may include additional tiers further illustrating the directionality of the risk agent with respect to the party. For example, if a risk agent is included in several products and/or activities between initial upstream production and terminal downstream usage by the party, the wedge corresponding to the risk agent may include a tier corresponding to each step in the stream from initial upstream production and terminal downstream usage by the party. This visualization can convey how many steps away from origination of the risk agent is the party's usage.

Visualization 300 can further include middle tier 306 and border tier 310, each corresponding to match quality (i.e., strength of the association) between the risk agent and the party. The middle tier 306 can be colored based on an upstream match quality value indicating a level of confidence that the party is an upstream producer of the risk agent. For example, the middle tier may be colored black if the party directly produces the risk agent, and the middle tier may be colored white if the party does not produce the risk agent. In some examples, the middle tier may be colored grey if there is some confidence that the party produces the risk agent. The border tier 310 can be colored based on a downstream match quality value indicating a level of confidence that the party is a downstream user of the risk agent. For example, the border tier may be colored black if the party is a downstream user of the risk agent. The border tier may be colored white if the party is not a downstream user of the risk agent. The border tier may be colored grey if the party is in an industry that is known to include downstream users of the risk agent but it is not known whether the party in particular uses the risk agent.

Figure 4:
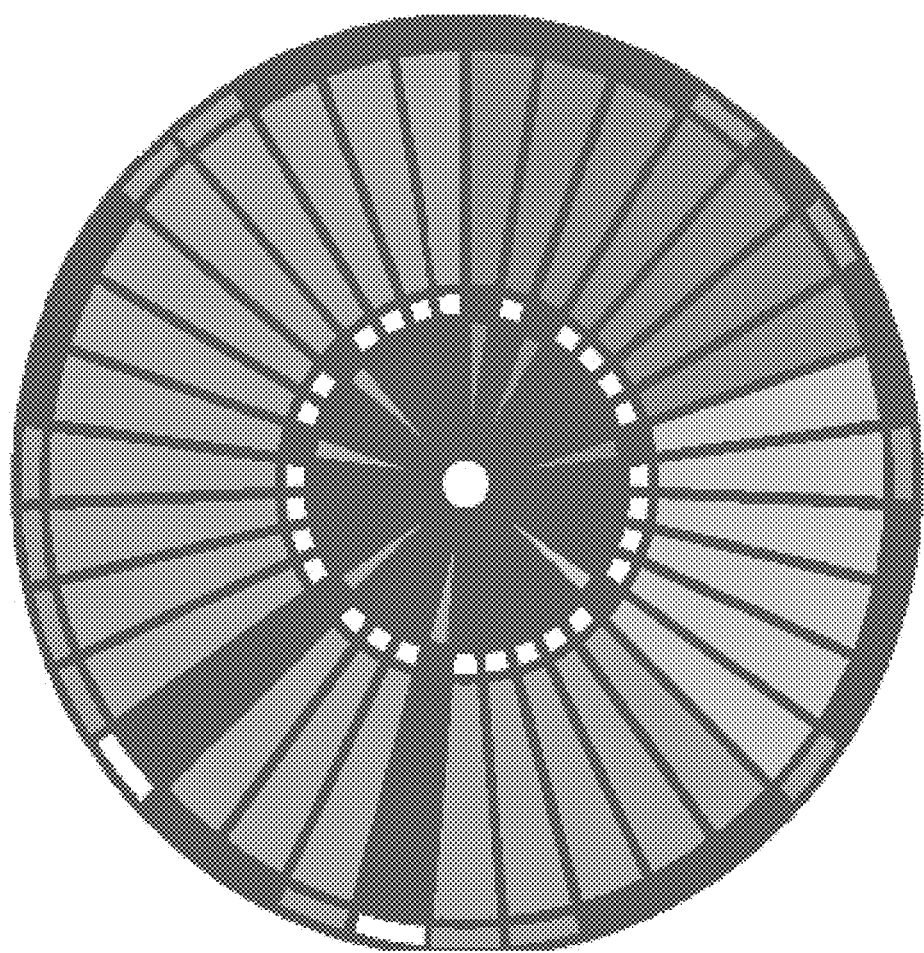
FIG. 4 illustrates another exemplary dartboard visualization of catastrophic risk presented by risk agents produced or used by a party according to examples of the disclosure.

In some examples, a total size of an inner tier across all wedges relative to a total size of an outer tier across all wedges may be based on a ratio of the number of upstream risk agents produced by the party to the number of downstream risk agents used by the party. For example, FIG. 3 illustrates 16 risk agents, 12 of which are upstream risk agents produced by the party and 12 of which are downstream risk agents used by the party. Accordingly, the total size of the inner tier across all wedges is not substantially different from the total size of the outer tier across all wedges. In contrast, FIG. 4 illustrates 35 risk agents, only 8 of which are upstream risk agents produced by the party and 33 of which are downstream risk agents used by the party. Accordingly, in FIG. 4 the outer tier across all wedges is larger than the inner tier across all wedges. In some examples, a ratio of the upstream risk agents to the downstream risk agents may be calculated, and the visualization may be generated such that the sizes of the inner and outer tiers may be based on the calculated ratio of the upstream risk agents to the downstream risk agents.

Figure 5:
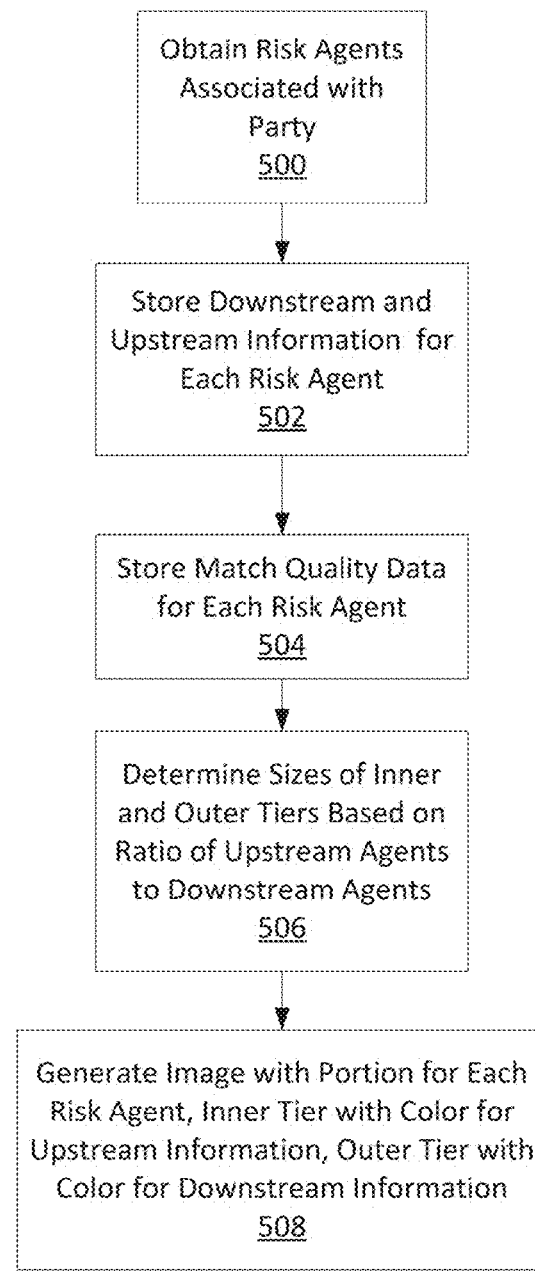
FIG. 5 illustrates an exemplary method for generating a visualization of a relationship between a party and a plurality of risk agents according to examples of the disclosure.

FIG. 5 illustrates an exemplary method for generating a visualization of a relationship between a party and a plurality of risk agents. Although FIG. 5 illustrates steps 500-508, not all steps may be performed according to various examples of the disclosure.

The plurality of risk agents associated with the party may be obtained (500). For example, the risk agents may be obtained from a database associating risk agents with various parties.

Downstream information and upstream information associated with each of the plurality of risk agents may be stored on a computer readable medium (502). The downstream information may include information indicating whether the associated risk agent is used by the party, and the upstream information may include information indicating whether the associated risk agent is produced by the party. In some examples, the downstream information may include a value indicating a risk to the party based on the party's use of the risk agent, and the upstream information may include a value indicating a risk to the party based on the party's production of the risk agent.

Match quality data associated with each of the plurality of risk agents may be stored on a computer readable medium (504). As discussed above, the match quality data may indicate a degree of confidence in a link between the party and a corresponding risk agent. Additionally the match quality data may include one or more of an upstream match quality value and a downstream match quality value.

Relative sizes of inner and outer tiers of the visualization may be determined based on a calculated ratio of a number of upstream risk agents to a number of downstream risk agents (506). Absolute sizes of the visualization may further be determined based on the absolute number of risk agents, so that two visualizations representing two different entities may be visually compared side by side. Similarly, the sizes may be based on a calculated ratio of the number of downstream risk agents to the number of upstream risk agents. In some examples, the sizes may be determined such that the ratio of a radius of the inner tier to a radius of the outer tier is equal to the calculated ratio of the number of upstream risk agents to the number of downstream risk agents.

An image with a portion for each risk agent can be generated (508). Each portion may include an inner tier with a color determined based on the upstream information associated with the corresponding risk agent and an outer tier with a color determined based on the downstream information associated with the corresponding risk agent. Additionally, the image may be generated based on the determined sizes of the inner and outer tiers. Further, each portion may include one or more additional tiers colored based on the match quality data associated with the corresponding risk agent.

In some examples, a user interface may be displayed including the visualization, and user input may be accepted on a portion allowing a user to access further information related to the risk agent associated with the portion. For example, a visualization of a plurality of catastrophic risk metrics associated with a risk agent (as described with reference to FIGS. 1A, 1B, and 2) may be displayed in response to user input on a portion corresponding to the risk agent.

Figure 6:
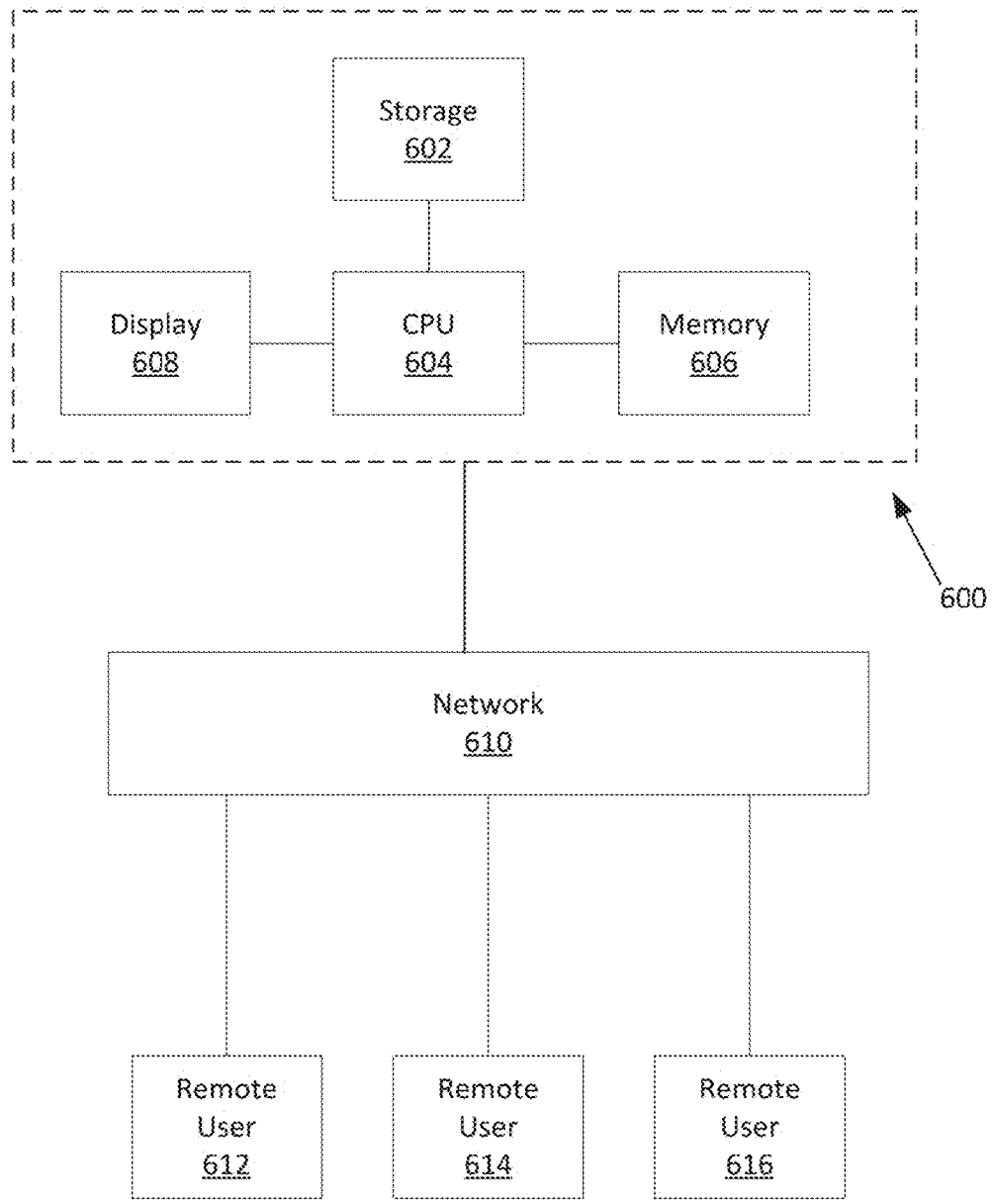
FIG. 6 illustrates an exemplary system for generating a visualization of catastrophic risk according to examples of the disclosure.

FIG. 6 illustrates an exemplary system 600 for generating a visualization of catastrophic risk according to examples of the disclosure. The system 600 can include a CPU 604, storage 602, memory 606, and display 608. The CPU 604 can perform the methods illustrated in and described with reference to FIGS. 1A-5. Additionally, the storage 602 can store data and instructions for performing the methods illustrated and described with reference to FIGS. 1A-5. The storage can be any non-transitory computer readable storage medium, such as a solid-state drive or a hard disk drive, among other possibilities. A visualization as described in various examples may be displayed on the display 608.

The system 600 can communicate with one or more remote users 612, 614, and 616 over a wired or wireless network 610, such as a local area network, wide-area network, or internet, among other possibilities. The system 600 may transmit a visualization in the form of an image data structure to the one or more remote users for display.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented method of visualizing a relationship between a party and a plurality of risk agents associated with the party, the method comprising:
displaying a first visualization within a graphical user interface on a display;
displaying, within the first visualization, a plurality of portions corresponding to the risk agents associated with the party;
displaying, in a first tier of a first portion of the plurality of portions, a downstream color selected according to a downstream risk value indicating risk to the party as a result of the party's downstream use of a first risk agent corresponding to the first portion;
displaying, in a second tier of the first portion, an upstream color selected according to an upstream risk value indicating risk to the party as a result of the party's upstream production of the first risk agent;
while the plurality of portions is displayed within the first visualization in the graphical user interface on the display, receiving user input on the first visualization;
in accordance with the user input selecting the first portion, updating the graphical user interface to display a second visualization associated with the first risk agent corresponding to the first portion, including displaying, within the second visualization, a first color selected according to a first risk metric value associated with the first risk agent;
and in accordance with the user input selecting a second portion of the plurality of portions, updating the graphical user interface to display a third visualization associated with a second risk agent corresponding to the second portion, including:
obtaining a second risk metric value associated with the second risk agent,
selecting a second color by mapping the second risk metric value associated with the second risk agent to a color, and
displaying, within the third visualization, the second color selected according to the second risk metric value associated with the second risk agent.

2. The method of claim 1, wherein displaying the plurality of portions corresponding to the risk agents associated with the party includes displaying the plurality of portions in a segmented dartboard configuration.

3. The method of claim 1, wherein the downstream risk value indicates a risk to the party based on the party's particular usage of the risk agent in a product or activity; and wherein the upstream risk value indicates an overall risk associated with the risk agent.

4. The method of claim 1, further comprising storing match quality data associated with each of the plurality of risk agents, the match quality data indicating a degree of confidence in a link between the party and a corresponding risk agent;
wherein each portion includes one or more additional tiers, each additional tier having a color determined based on the match quality data associated with the corresponding risk agent.

5. The method of claim 4, wherein the match quality data includes an upstream match quality value and a downstream match quality value, the upstream match quality value indicating a level of confidence that the party is an upstream producer of the corresponding risk agent and the downstream match quality value indicating a level of confidence that the party is a downstream user of the corresponding risk agent.

6. The method of claim 1, further comprising:
calculating a ratio between a number of upstream risk agents and a number of downstream risk agents; and
determining a size of the second tier based on the calculated ratio;
wherein displaying the upstream color in the second tier includes displaying the upstream color based on the determined size of the second tier.

7. The method of claim 1, further comprising:
calculating a number of risk agents; and
determining a size of the first tier based on the calculated number;
wherein displaying the downstream color in the first tier includes displaying the downstream color based on the determined size of the first tier.

8. The method of claim 1, wherein the first tier is an outer tier and the second tier is an inner tier.

9. A non-transitory computer readable storage medium storing instructions executable to perform a method of visualizing a relationship between a party and a plurality of risk agents associated with the party, the method comprising:
displaying a first visualization within a graphical user interface on a display;
displaying, within the first visualization, a plurality of portions corresponding to the risk agents associated with the party;
displaying, in a first tier of a first portion of the plurality of portions, a downstream color selected according to a downstream risk value indicating risk to the party as a result of the party's downstream use of a first risk agent corresponding to the first portion;
displaying, in a second tier of the first portion, an upstream color selected according to an upstream risk value indicating risk to the party as a result of the party's upstream production of the first risk agent;
while the plurality of portions is displayed within the first visualization in the graphical user interface on the display, receiving user input on the first visualization;
in accordance with the user input selecting the first portion, updating the graphical user interface to display a second visualization associated with the first risk agent corresponding to the first portion, including displaying, within the second visualization, a first color selected according to a first risk metric value associated with the first risk agent;
and in accordance with the user input selecting a second portion of the plurality of portions, updating the graphical user interface to display a third visualization associated with a second risk agent corresponding to the second portion, including:
obtaining a second risk metric value associated with the second risk agent,
selecting a second color by mapping the second risk metric value associated with the second risk agent to a color, and
displaying, within the third visualization, the second color selected according to the second risk metric value associated with the second risk agent.

10. The non-transitory computer readable storage medium of claim 9, wherein displaying the plurality of portions corresponding to the risk agents associated with the party includes displaying the plurality of portions in a segmented dartboard configuration.

11. The non-transitory computer readable storage medium of claim 9, wherein the downstream risk value indicates a risk to the party based on the party's particular usage of the risk agent in a product or activity; and
wherein the upstream risk value indicates an overall risk associated with the risk agent.

12. The non-transitory computer readable storage medium of claim 9, the method further comprising storing match quality data associated with each of the plurality of risk agents, the match quality data indicating a degree of confidence in a link between the party and a corresponding risk agent;
wherein each portion includes one or more additional tiers, each additional tier having a color determined based on the match quality data associated with the corresponding risk agent.

13. The non-transitory computer readable storage medium of claim 12, wherein the match quality data includes an upstream match quality value and a downstream match quality value, the upstream match quality value indicating a level of confidence that the party is an upstream producer of the corresponding risk agent and the downstream match quality value indicating a level of confidence that the party is a downstream user of the corresponding risk agent.

14. The non-transitory computer readable storage medium of claim 9, the method further comprising:
calculating a ratio between a number of upstream risk agents and a number of downstream risk agents; and
determining a size of the second tier based on the calculated ratio;
wherein displaying the upstream color in the second tier includes displaying the upstream color based on the determined size of the second tier.

15. The non-transitory computer readable storage medium of claim 9, the method further comprising:
calculating a number of risk agents; and
determining a size of the first tier based on the calculated number;
wherein displaying the downstream color in the first tier includes displaying the downstream color based on the determined size of the first tier.

16. The non-transitory computer readable storage medium of claim 9, wherein the first tier is an outer tier and the second tier is an inner tier.

* * * * *